Aug. 8, 1944.　　　A. C. HOLT　　　2,355,297
PERFORATING APPARATUS
Filed Nov. 10, 1942　　　7 Sheets-Sheet 1

FIG.1.

INVENTOR
Albert C. Holt
BY
ATTORNEY

Aug. 8, 1944.  A. C. HOLT  2,355,297
PERFORATING APPARATUS
Filed Nov. 10, 1942  7 Sheets-Sheet 2

INVENTOR
Albert C. Holt
BY
ATTORNEY

INVENTOR
Albert C. Holt
BY
W. M. Wilson
ATTORNEY

Aug. 8, 1944.　　　A. C. HOLT　　　2,355,297
PERFORATING APPARATUS
Filed Nov. 10, 1942　　　7 Sheets-Sheet 4

INVENTOR
Albert C. Holt
BY W. M. Wilson
ATTORNEY

Aug. 8, 1944.　　　　A. C. HOLT　　　　2,355,297
PERFORATING APPARATUS
Filed Nov. 10, 1942　　　7 Sheets-Sheet 5

INVENTOR
Albert C. Holt
BY
W. M. Wilson
ATTORNEY

Aug. 8, 1944.     A. C. HOLT     2,355,297
PERFORATING APPARATUS
Filed Nov. 10, 1942     7 Sheets-Sheet 6

INVENTOR
Albert C. Holt
BY
W. Wilson
ATTORNEY

Aug. 8, 1944.  A. C. HOLT  2,355,297
PERFORATING APPARATUS
Filed Nov. 10, 1942    7 Sheets-Sheet 7

INVENTOR
Albert C. Holt
BY
ATTORNEY

Patented Aug. 8, 1944

2,355,297

UNITED STATES PATENT OFFICE 2,355,297

PERFORATING APPARATUS

Albert C. Holt, Oradell, N. J., assignor to International Business Machines Corporation, New York, N. Y., a corporation of New York Application November 10, 1942, Serial No. 465,113

3 Claims. (Cl. 164—113)

This invention relates to perforating apparatus, and more particularly to control means for tape perforating apparatus.

An object of the present invention resides in the provision of an improved perforating apparatus whereby a series of feed perforations, or other timing perforations, such as a fixed code selection, is automatically formed in the tape, the number of timing perforations in the series being dependent upon the time of duration of the functional controlling effects.

In recording systems, such as printing telegraph systems, in many instances the operations of the printers are controlled by signals initiated under the control of perforated tapes. In such systems wherein the tapes are continuously fed through the tape reading or sensing means (in contradistinction to the tapes fed step by step), provision must be made for compensating for the time lag present in the controlled printers, whenever the latter are rendered effective to perform certain functional operations, such as tabulating or carriage return operations.

In certain cases, the tape feed operations are suspended momentarily during the printer functional operations, and then renewed upon the completion of the latter operations. In other cases, it is preferred to continue the tape feeding operations during the time the said functional operations are performed. Thus, in the latter case it is necessary to have the tapes prepared so that sufficient space intervals occur between the character code designating perforations on the tapes at the times the controlled printer performs such functional operations. Otherwise, the character signals initiated in accordance with the sensed character code designating perforations would be impressed upon the control means of the printer at the times the functional operations are effected, and thereby prevent proper response to the said character signals.

For illustrative purposes, the present invention is embodied in apparatus comprising a tape perforating unit similar to the unit shown and claimed in a copending application Serial No. 438,973, filed April 15, 1942, by A. C. Holt, which unit is controlled by a printer unit based on the principles of construction of the well known Electromatic typewriter and similar to the unit shown in U. S. Patent No. 2,161,564, issued June 6, 1939, to Fitch et al. Briefly, the tape perforating unit is provided with cyclically operable eccentric means arranged to actuate or oscillate selected interposers, which interposers when latched at the one end thereof are effective to operate the punch elements connected to the other ends of the interposers. Start-stop control means are provided for controlling the perforating operations, so that normally the said eccentric means, the interposers, and connected punch elements are at rest. The said interposers are selectively latched under control of the printer unit, in predetermined combinations, whenever the character and functional operation key bars of the latter unit are operated, thereby causing combinations of character code designating perforations to be formed in the tape in accordance with the character selections made in the printer unit. Provision is made for rendering the said start-stop control means operative so as to actuate the punch elements as soon as the selected interposers are latched.

Additional control means are provided, such as contacts, which are arranged to cooperate with and be operated by the tabulating and carriage return control mechanisms of the printer unit. The said contacts are operated so long as the said control mechanisms are effective to perform the particular functional operations of the printer. These contacts, in turn, are effective to render the start-stop control means operative and maintain the latter operative, so long as the contacts are operated, thereby operating certain timing punch means successively a controlled number of times in order to produce a proportionate number of timing perforations in the tape. For example, in tabulating operations the time interval required for completing such operations depends directly on the desired lengths of tabulations. Thus, for functional operations of varying periods of time, the punch means for forming the timing perforations is rendered operative successively and continuously for different timed periods; thereby forming series of timing perforations in the tape, each composed of a number of perforations commensurate with the length of the period.

The system may be arranged in different ways. Thus, the receiving station may consist simply of a printer controlled by the transmitted signals; or it may comprise a reproducing punch controlled directly by the transmitted signals, to make a perforated tape which can be used subsequently to control a printer; or it may comprise a printer controlled by the transmitted signals, and locally controlling a punch, in a manner identical to the printer and punch at the sending station.

In either case where the transmitted signals control a printer, the timing perforations may be simply feed hole perforations, the only effect of which is to separate groups of character code perforations of the transmitting tape, where a functional operation of the printers must intervene. On the other hand, where the receiving station comprises a reproducing punch controlled directly by the transmitted signals, the timing perforations must include a fixed code selection, which will cause the receiving punch to space, but will be without influence upon a printer controlled by the reproduced tape.

Accordingly, another object of the present invention is to provide a printer controlled tape perforating apparatus, wherein the initiation of a functional operation of the printer starts and maintains continuous operation of timing punch means, such as the feed hole punch, or a fixed code selection capable of causing the punch at the receiving station to space, until the functional operation is completed. Thereby, following the code combination of perforations designating the particular functional operation, the tape is formed with a series of timing perforations, which will interrupt the transmission of printing signals from the tape during the period required by the receiving printer to carry out the same functional operation. This functional operation of the receiving printer will be initiated by the particular code combination of holes preceding the series of timing perforations. The number of perforations in the series will vary in dependence upon the time required by the printers to carry out the particular functional operation.

Other objects of the invention will be pointed out in the following description and claims and illustrated in the accompanying drawings, which disclose, by way of example, the principle of the invention and the best mode, which has been contemplated, of applying that principle.

Figure 1:
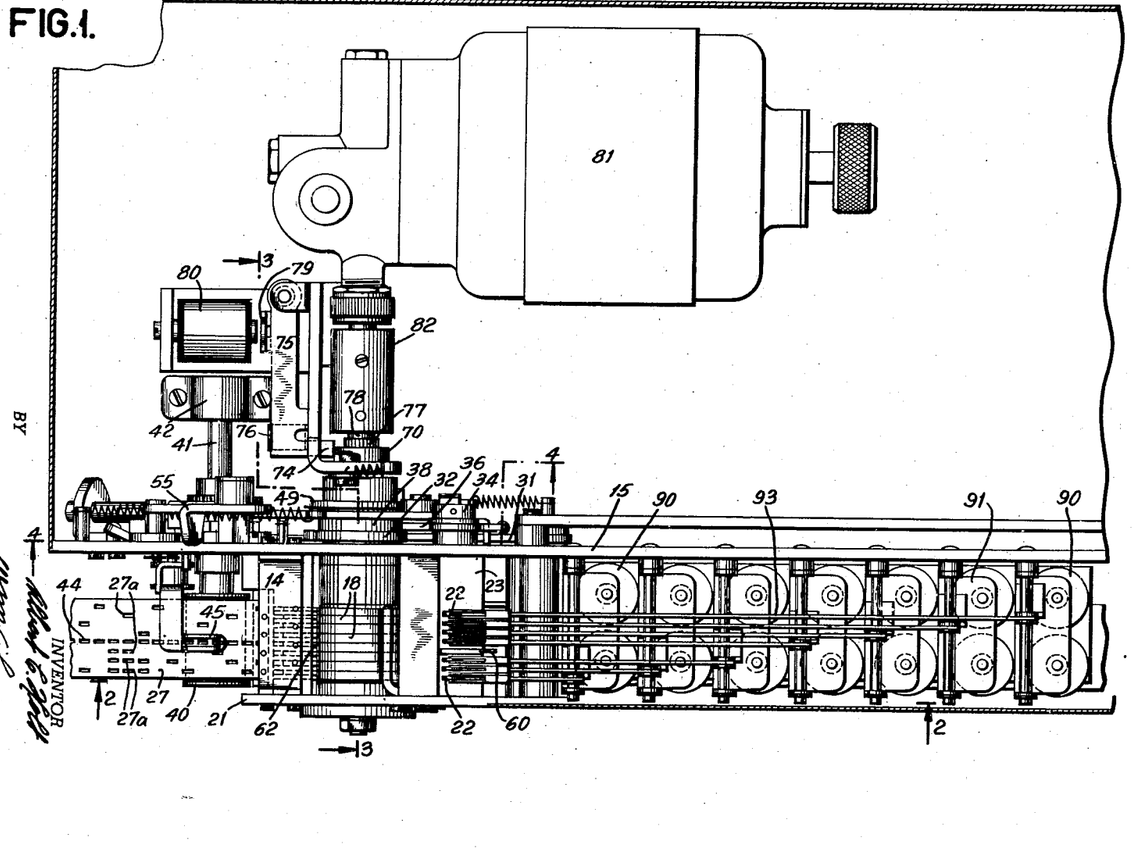
Fig. 1 is a plan view of the tape perforating unit.
Figures 2, 17, 17A:
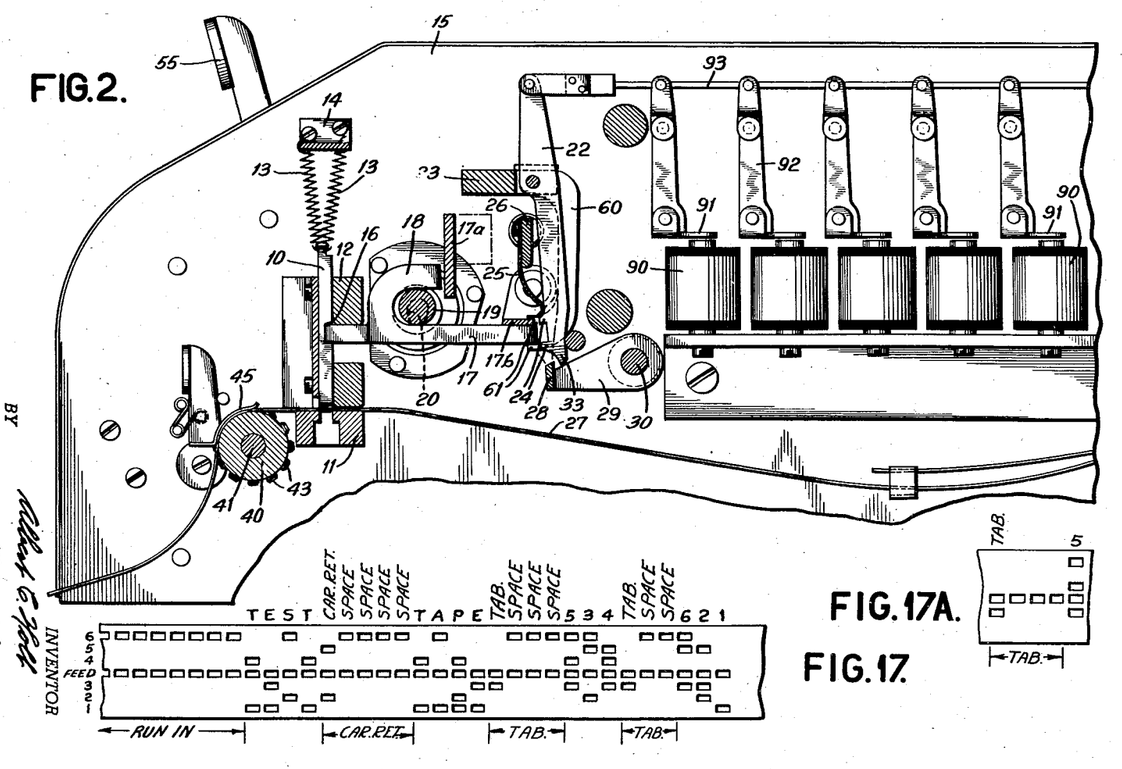
Fig. 2 is a sectional view of the perforating unit taken along the line 2—2 of Fig. 1.
Fig. 17 is a section of tape, illustrating groups of code signals separated by series of timing perforations, namely a feed hole and a 6-hole, which is a punch spacing signal.
Fig. 17A is another section of tape showing timing perforations, in this case only feed holes.
Figure 3:
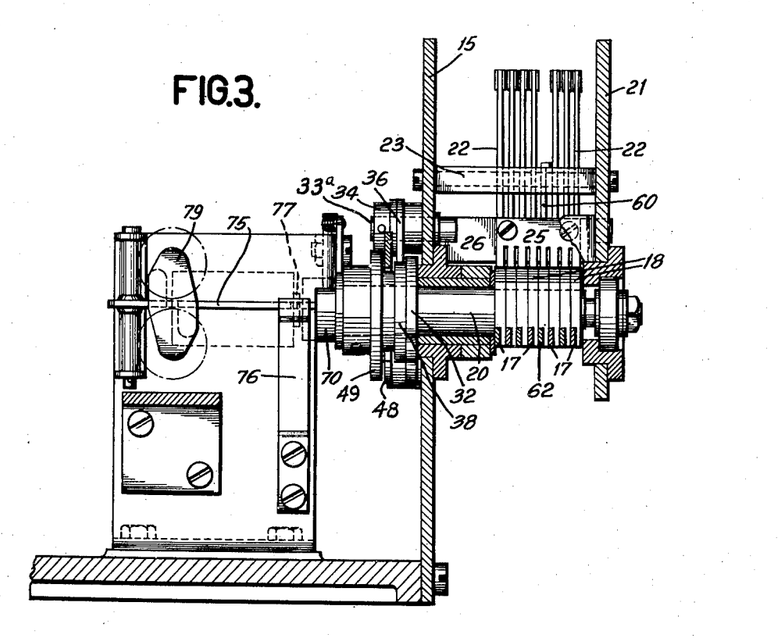
Fig. 3 is a sectional view taken along the line 3—3 of Fig. 1.

Referring now to Figs. 1, 2 and 3, the perforating apparatus is shown to include individual punch elements 10, one for each column of perforations, and a common die block 11. The punch elements are slidably arranged in a common punch guide block 12 and are normally held in raised positions by means of individual springs 13. The said springs are supported by a bracket 14 which is suitably secured to side plate 15. The said punch guide and die blocks are also suitably secured to the side plate 15. Each punch element 10 is provided with a recess 16, into which recess is placed one end of a positionable interposer 17 having a yoke portion 18. An individual interposer 17 is provided for each punch element 10. An elongated cam or eccentric 19 is carried by, or if desired, formed on shaft 20, which shaft is suitably journaled in the side plate 15 and end plate 21. The eccentric 19 is located within the bows of the yokes of the individual and adjacent arranged interposers to support and actuate or oscillate the said interposers. Normally, during the rotation of the eccentric, the interposers are moved downwardly and upwardly (as viewed in Fig. 2) by the supporting eccentric about the pivotal connections formed by the ends of the interposers engaging the recesses of the related punch elements. Under these conditions, it is seen, that the free ends of the interposers are partially rotated, first in one direction and then the other direction, or stated in other words, the said free ends of the interposers are oscillated. Suitably disposed stop guides 17a and 17b are provided to maintain proper alignment of the said oscillated interposers.

Individual latch arms 22 are provided, one for each interposer, and are pivotally mounted in a slotted guide block 23 secured to the said side and end plates. Near the lower end of each latch arm, a pair of spaced latching fingers 24 are provided, which fingers are disposed in close proximity to, but normally held out of the path of the rotatable ends of the interposers by means of a slotted leaf spring 25 secured to a reset bail 26. The bail 26 is rotatably mounted on the said side and end plates, and is elongated sufficiently to permit engagement of the bail with all the latch arms 22. Spring 25 is elongated sufficiently so that the individual slotted sections engage the related latch arms.

Whenever it is desired to operate a punch element 10, the related latch arm is partially rotated, in a clockwise direction (as viewed in Fig. 2), against the action of the said leaf spring 25, so that its latch fingers 24 engage and latch the free end of the related interposer. It should be mentioned, at this time, that, in the present embodiment, the shaft 20 carrying the eccentric 19 is not constantly rotated, but operated in a start-stop fashion, and that the latch arms 22 are arranged to be positioned to latch the desired interposers before the rotated eccentric displaces or oscillates the said interposers. Thus, upon latching of an interposer 17 and rotation of the eccentric 19, the said interposer is positioned, by the eccentric, about the pivotal connection formed by the latch arm and the latched end of the interposer, to force the related punch element 10 downwardly (in Fig. 2), thereby causing the sheet, such as a paper tape 27, interposed between the said guide and die blocks, to be perforated. The eccentric 19 is shaped so that the lower end, or cutting edge, of the displaced punch element is forced through the paper tape, and then retracted therefrom immediately and restored to the normal position shown in Fig. 2.

Locking means are also provided for holding the displaced latch arm or arms in a latched position, and for preventing displacement of undesired latch arms during the rotation of the eccentric. This means comprises a locking bail 28, which is common to all latch arms 22, and which is suitably secured to an arm 29, which arm 29 in turn is fixed to shaft 30. Shaft 30 is rotatably mounted on said side and end plates, and also has affixed thereto a spring urged cam follower arm 31 (also see Fig. 6), cooperating with cam 32 secured to the start-stop shaft 20. Cam 32 is shaped so that normally (with the shaft 20 in a stop position) the locking bail 28 is held in a position so as to be out of the path of the extension 33 of each latch arm 22. Upon displacement of the desired latch arms in the said latching position, and upon rotation of shaft 20, the follower arm 31 drops from the high portion of the cam 32 to permit the locking bail 28 to be raised (in Fig. 2) in the path of the said latch arm extensions, thereby engaging the said extensions of the displaced latch arms and locking them in the latching position, as shown in dotted outline in Fig. 2. This position of the said locking bail also prevents any faulty displacement of the normally positioned latch arms, since the bail is now effective to engage the extensions of any latch arms which inadvertently might be displaced during the rotation of shaft 20, thereby blocking further clockwise rotation of these latch arms, and preventing engagement of the latching fingers 24 and the latching ends of the related interposers 17. The said raised position of locking bail 28 is maintained until near the end of the cycle of rotation of the shaft, when the high portion of cam 32 again engages the follower arm 31 to lower the said bail. Obviously, the said bail must be lowered before the latch arms 22 are positively restored by the action of the said reset bail 26. In practice, it has been found desirable to maintain the locking bail 28 in the said raised positions from the 12° point to the 285° point in the cycle of rotation of shaft 20.

Figures 4, 5:
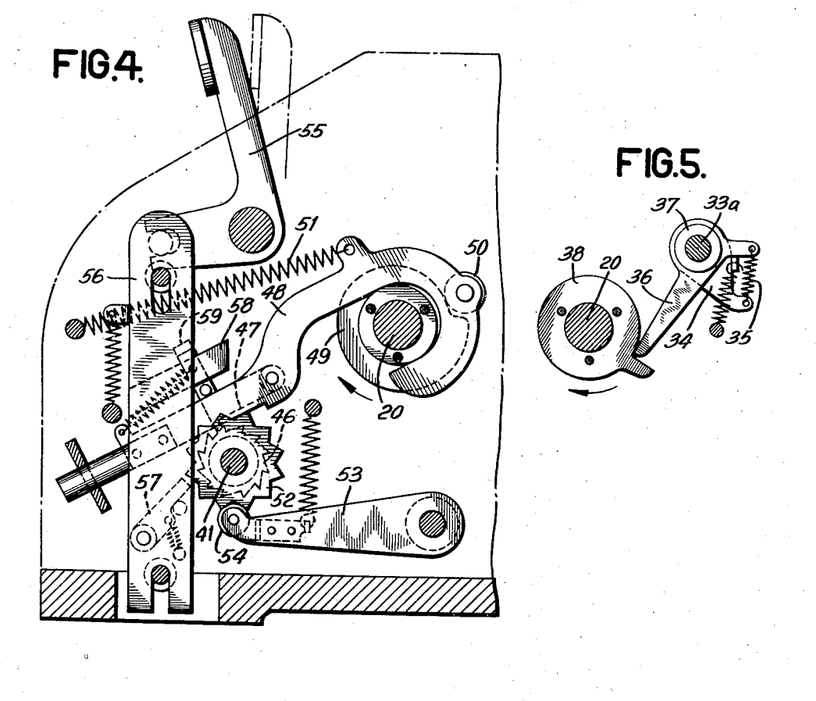
Fig. 4 is a sectional view taken along the line 4—4 of Fig. 1, showing the tape feeding means.
Fig. 5 is a detail view of the cam control means for the resetting means.

For this arrangement, it is preferred to render the reset bail 26 operative from the 303° point to the 352° point in the said cycle. The said bail 26 is secured to shaft 33a (also see Fig. 3) journaled in the side plate 15, which shaft has affixed thereto a spring urged arm 34 (Fig. 5). Arm 34 is resiliently connected by means of spring 35 to a cam follower arm 36 secured to sleeve 37, which sleeve is loosely mounted on shaft 33a. In this manner follower arm 36 is constantly urged against cam 38 secured to shaft 20. Said cam 38 is effective, near the end of each cycle of rotation of shaft 20 to partially rotate the follower arm 36 and shaft 33a in a counterclockwise direction (Fig. 5) to cause the bail 26 and attached spring 25 to be partially rotated in a counterclockwise direction to positively urge and restore the latch arms 22 to the normal position out of the path of the latching ends of the related interposers 17, as shown in Fig. 2.

Suitable means for intermittently advancing the paper tape 27 are provided, which means in the present arrangement are operated near the end of each cycle of rotation of the said shaft 20. Specifically, the paper feeding mechanism is called into action from the 334° point to the 356° point in each cycle. The paper tape 27 is intermittently fed from a suitable supply roll (not shown) to the punching station by feed roll 40 secured to shaft 41, which shaft is suitably journaled in side plate 15 and a suitable support 42. Said feed roll 40 is provided with centrally located and equally spaced teeth 43 for engaging the centrally located feed perforations 44 in the tape 27. A positionable arcuately shaped tape finger guide 45 is provided to hold the tape against the said feed roll. Shaft 41 has secured thereto a ratchet wheel 46 (also see Fig. 4) which is advanced by a spring urged cooperating pawl 47 pivotally mounted on a suitable cam follower arm 48, which arm cooperates with cam 49. Cam 49 is shaped so as to move the follower arm 48 sufficiently to the right (as viewed in Fig. 4) so that pawl 47 is positioned ahead of one of the teeth of ratchet wheel 46. Approximately, at the 334° point in the cycle, the cam roller 50 drops from the high point of cam 49 permitting the follower arm 48 to be moved towards the left (Fig. 4), by means of spring 51, thereby causing the pawl 47 to engage a tooth of the ratchet wheel and advance it one step, in a counterclockwise direction. Thus, the tape 27 is advanced to present the next position thereon to the punching station. Yieldable locking means are provided to hold the feed roll 40 in the advanced position, which comprise the cam wheel 52 secured to shaft 41 and the spring urged pivotally mounted detent arm 53 provided with a roller 54 riding on the said cam wheel.

With this type of tape feeding and locking means, it is possible, when desired, to feed the tape in a reverse direction, step by step. Manually operable lever 55 is provided for this reason, and is pivotally mounted on the side frame 15. Lever 55 is connected, by a pin and slot arrangement, to member 56 which is slidably mounted on side plate 15. Member 56 carries a spring urged, pivotally mounted pawl 57 and a camming element 58. Thus, when lever 55 is partially rotated in a clockwise direction, as viewed in Fig. 4, member 56 is raised causing pawl 57 to engage one of the teeth of cam wheel 52 and position it one step in a clockwise direction, and consequently causing the feed roll 40 to feed the tape one step, in the reverse direction. While the member 56 is being raised, the camming element 58 is effective to engage a bent over portion 59 of the pawl 47 to raise the latter above the ratchet wheel 46 so as to permit the reverse rotation of the said ratchet wheel and feed roll.

From the description up to this point, it is understood, that, at the start of each cycle of rotation of shaft 20, the latch arms 22 are positioned in any desired combination so as to be partially rotated, in a clockwise direction (Fig. 2), in order to latch the free ends of the related interposers 17. Next, the locking bail 28 is operated to engage and lock the displaced latch arms 22 in a latched position, during a major part of the cycle, and to prevent further latching operations by the remaining latch arm or arms during this cycle. Eccentric 19 is then effective to oscillate the latched interposers 17 causing the connected punch elements to be operated to perforate the paper tape 27, in accordance with the selected combination of operated punches, while the said tape is at rest at the punching station (see perforations 27a). Near the end of the cycle, after the punching operation, that is, when the punch elements are withdrawn completely from the paper tape and restored to the normal position shown in Fig. 2, the locking bail 28 is restored to its normal position, and the reset bail 26 is rendered operative to restore the latch arms to their normal positions, thereby releasing the latching ends of the related interposers. The tape feeding mechanism is also rendered operative, near the end of the cycle to advance the paper one step, thus presenting the next punching position on the tape to the said punch elements.

It should be mentioned, at this time, that the centrally located perforations 44 are not originally provided in the paper tape 27, but are formed therein during each punching operation. For this purpose, a special latch arm 60 (see Figs. 1, 2 and 3) is provided, which is fixedly secured to the slotted guide block 23. This latch arm is also provided with latching fingers 61 similar to latching fingers 24, which fingers 61 constantly grip or engage the latching end of the related interposer 62, so that, during each punching operation, the said interposer 62 is effective to operate the connected punch element, similarly as described hereinabove. In this way, the centrally located feed perforations 44 are formed in the paper tape. It is to be noted, that latch arm 60 is not provided with an extension 33 as latch arms 22, and obviously there is no need for it, since latch arm 60 always remains in a fixed position. Also, it is to be noted in Fig. 2, that this special latch arm 60 is arranged and disposed so as not to be engaged by or interfere with the said operations of the reset bail 26 and associated leaf spring 25.

Figures 6, 7:
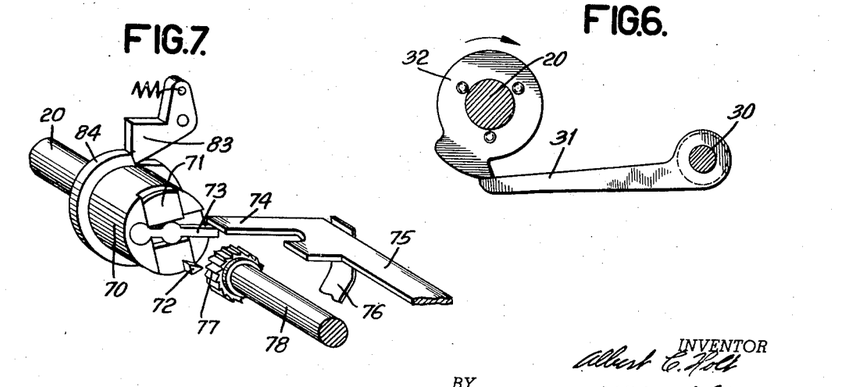
Fig. 6 is a detail view of the cam control means for the locking means.
Fig. 7 is an exploded view of the start-stop clutch means.

In order to control the start-stop operations of shaft 20, a well known type of electromagnetically controlled, one-revolution clutch means is provided. For a detailed description of the clutch mechanism, reference should be made to U. S. Patent No. 2,206,646, issued to Schneider, July 2, 1940. Accordingly, the brief description to be given is deemed sufficient for complete comprehension of the present invention. In Figs. 1, 3 and 7, this clutch means is shown to comprise an annular member 70 which is secured to shaft 20. A slidable and spring urged dog member 71 is disposed in a suitable channel formed in the said annular member, which dog member is provided with a single tooth 72. A dog lift lever 73 is pivotally mounted in the annular member 70, and is disposed in a suitable channel-way formed in the slidable dog member 71. The free end of the said dog lift lever extends beyond the periphery of the annular member 70 and normally is positioned against a stop 74 formed on the suitably pivoted arm 75, which arm normally is urged by leaf spring 76 so that the said stop 74 is in the path of the dog lift lever 73. With the described elements of the clutch means in this position, the dog lift lever 73 is effective to hold the dog member 71 so that the single tooth formed thereon is out of the path of a ratchet wheel 77, secured to constantly rotated shaft 78, and disposed in close proximity to the annular member 70. Secured to the said pivoted arm 75 is an armature 79 of an associated and suitably disposed magnet 80; which armature, upon momentary energization of magnet 80, positions the stop 74 of arm 75 out of the path of the dog lift lever 73, thereby releasing the latter and permitting the dog member 71 to be positioned so that its tooth 72 engages the ratchet wheel 77. Shaft 78 is constantly rotated by means of motor 81, the shaft of which is connected to shaft 78 by a suitable coupling device 82. In this manner, shaft 20 is rotated. Upon completion of a cycle of rotation of shaft 20, the dog lift lever 73 is urged against the said stop 74 to disconnect the tooth 72 of the dog member from the constantly rotated ratchet wheel 77, thus preventing further rotation of this shaft. Suitable locking means are provided for this described clutch, and comprise a suitably disposed, spring urged pawl 83 cooperating with a suitable notch formed in the flange 84 of the annular member.

It will be evident to those skilled in the art, that various types of control means can be employed for selectively positioning the latch arms 22, and thereby controlling selectively the operations of the punch elements 10. One type of control means will now be described, and comprises, as shown in Figs. 1 and 2, a plurality of individual magnets 90. Connected to each armature 91, of the related magnet 90, is an arm 92 provided with a loosely connected link 93 extending to and suitably connected with one of the latch arms 22. Each armature is connected to one of the latch arms in the said manner, so that, upon energization of a magnet 90, the attracted armature 91 positions the attached link 93 to the right, as viewed in Fig. 2, thereby causing the related latch arm 22 to be positioned in the described latching position.

The apparatus so far described is the same as that disclosed in my copending application referred to above, Serial No. 438,973, filed April 15, 1942. The present improvement is concerned with means for controlling the operation of the punch by a machine which must execute certain functional operations from time to time, such as returning a carriage, or tabulating. As stated above, the primary object of the improvement is to provide for continued operation of the feed hole punch element or a fixed code selection during such functional operations, in order to produce a series of timing perforations in the tape, for the correct length to allow the receiving instrument, when the code is transmitted from the tape, to execute the same functional operation, before the transmission of code begins again. By way of example the improvement will be described as embodied in a system wherein the tape punch is controlled by a typewriter. The particular typewriter chosen for illustration is a Radiotype, similar to the one described in the patent to C. J. Fitch et al., No. 2,161,564.

Figure 9:
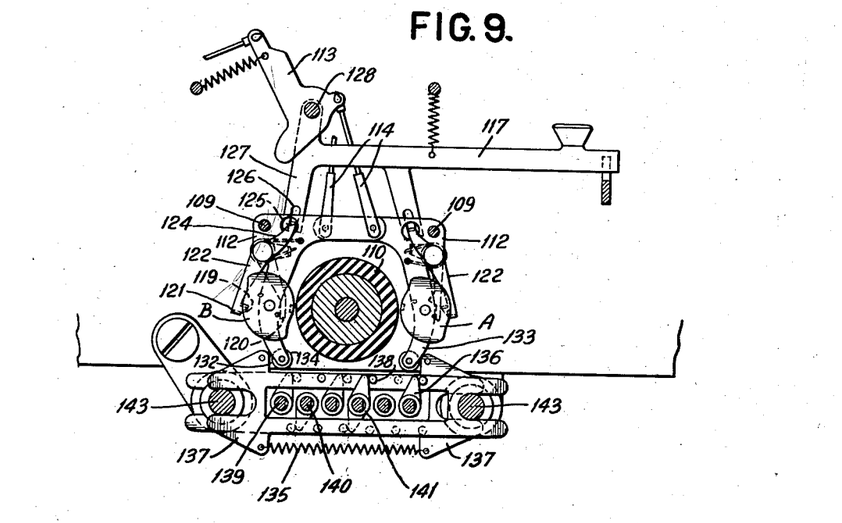
Fig. 9 is a vertical sectional view of the keyboard and power cam mechanism of a Radiotype printer.

As shown in Fig. 9, the typewriter comprises a power driven roller 110, at the front and back of which are arranged two sets of cams A and B. The cams are journaled upon oppositely arranged bell cranks 112 pivoted upon stationary rods 109. The upper ends of the bell cranks 112 are connected to their related typebar operating levers 113 by links 114. The levers 113 are pivoted upon a stationary rod 128, upon which key bars 117 are also pivoted. The key bars control latch levers 122 having latches 121 engaging lugs 119 on the related cams, to hold them against the action of spring influenced arms 120, which tend to rotate the individual cams, to throw their eccentric peripheries toward the roller 110. The latch levers 122 are pivoted on the bell cranks 112 and have upwardly extending arms 124 with bent over ends 125 engaging in slots 126 of the downwardly extending arms 127 of their related key bars 117. Upon actuation of a key bar, the latch lever releases the cam, which is rocked against the roller 110 by the spring arm 120 and caused to execute one half revolution, in the course of which it rocks out the bell crank 112 and operates the typebar. This mechanism is all well known and does not require further description here.

Figure 10:
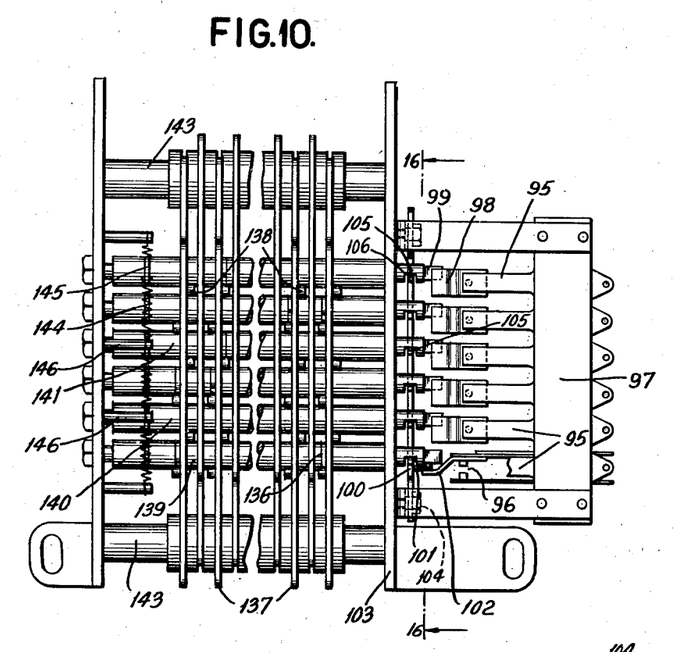
Fig. 10 is a plan view of the contact operating mechanism of the Radiotype printer, with a central portion removed.

Beneath the power roller 110 is a set of six permutation bars 140, suitably mounted in the frame of the machine for rocking motion about their axes. The permutation bars are rocked in various combinations as the different keys are actuated, through slides 137 guided for limited horizontal movement upon grooved bars 143 and having shoulders 132 against which bear rollers 134 mounted upon downward extensions 133 of the bell crank levers 112. The slides 137 are in two groups, one group being moved forward by the operation of their related keys, while the other is moved rearward. The slides operated by the A cams are moved forward, while those operated by the B cams are moved rearward. The slides are held in their normal unoperated position by springs 135 interconnecting each slide with its neighboring slide. Each slide has six studs 138 projecting alternately upon opposite sides (see also Fig. 10). The studs 138 of the slides operated by the A cams are on the lower bars of the slides, while those of the slides operated by the B cams are on the upper bars of the slides. The permutation bars 140 are flattened on one side and have distributed along them, and spaced by collars 141, arms 136, which extend upward or downward, to cooperate with the studs 138 on the slides 137, and have apertures with a straight side, complementary to the flat-sided cross section of the bar 140, to prevent rotary movement of the arm on the bar. The number and position of the arms 136 arranged for cooperation with the studs of a particular slide determine which permutation bars will be rocked by that slide. The permutation bars are biased by springs 144 connected to arms 145, similar to the arms 136, located at the left ends of the permutation bars. The springs 144 are anchored upon stationary pins 146 and are arranged alternately above and below the permutation bars, so as to bias the arms 136 against their related studs 138.

Figure 11:
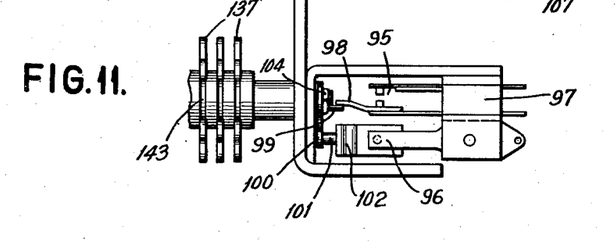
Fig. 11 is a front elevation of a portion of the contact operating mechanism.
Figure 16:
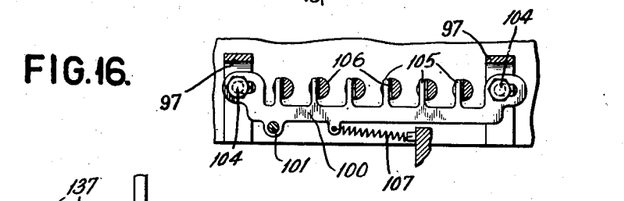
Fig. 16 is a sectional view on the line 16—16 of Fig. 10.

At the right end of the set of permutation bars a group of six pairs of selector contacts 95 and one pair of start contacts 96 are mounted upon a switch frame 97, which is secured to a frame bar 103 by screws 104 (see also Figs. 11 and 16). The lower contact members of the pairs of selector contacts carry strips of insulating material 98 pressed firmly against flat cam pieces 99 on the ends of the permutation bars 140 by the spring action of the contact. Any permutation bar which is rocked will close its contacts 95. The start contacts 96 are operated by a universal bar 100 slidably mounted on collar portions of screws 104 and carrying a stud 101, which bears against a strip of insulating material 102 fixed to one of the contact members 96. The universal bar 100 has on its upper edge teeth 105 which stand in front of flat faces 106 of the permutation bars 140, so that the bar 100 will be cammed to the left (Fig. 16), against the pull of a spring 107, when any one of the permutation bars is rocked. Thus, the rocking of any permutation bar will close the start contacts, this closure being timed to occur after the selector contacts 95 have been closed. The circuit diagram (Fig. 8), shows the selector contacts 95 controlling the circuits of individual punch selector magnets 90, while the start contacts 96 control the circuit of the punch clutch magnet 80. As each key is struck, the contacts 95 pertaining to that key will close and energize the punch selector magnets 90 and the start contacts 96 will close subsequently to energize the clutch magnet 80.

It will be observed that the punch unit has seven selector magnets 90, while the control printer has only six pairs of selector contacts 95, demonstrating the flexibility of the apparatus in respect to the type of code which can be used. In this case the number 7 punch selector magnet is unused, the selector contacts being connected, respectively, to magnets numbers 1 to 6. The tape produced will be in six point code, as illustrated in Fig. 17, wherein the code positions are numbered 1, 2, 3, 4, 5, and 6, the central perforations being feed holes. If a seven point code is preferred, the control printer will be provided with a corresponding number of permutation bars and appurtenant selector contacts and all seven punch selector magnets will be utilized, to punch code of the character illustrated in Fig. 1. The 7 hole can also be used for control or signalling purposes.

The carriage return mechanism shown in the drawings (see Fig. 12) is similar to the one disclosed in the Hillis Patent No. 2,104,559, to which reference is made for a full description of its construction. The carriage return key lever 170, pivoted on the rod 128, releases a single lobed cam 172, which is rocked against the power driven roller 110 and thereby rotated through a full revolution. The cam 172 is journaled upon a bell crank lever 171 pivoted on the rod 109 and is connected by a link 173 to the end of a lever 166, which forms part of a clutch operating toggle mechanism. The lever 166 is pivoted at 165 upon a stationary bracket 157 and behind this bracket is articulated to the end of a lever 160 pivoted at 161 upon a stationary bracket 156. An actuating arm 159, also pivoted at 161, is adjustably secured at its upper end to the lever 160, by a screw 164. The lower end 162 of the arm 159 stands opposite the hub 152 of a clutch 149, pivotally mounted on an extension of the shaft of roller 110, which does not show in the drawings. The clutch 149, when pressed inward by the toggle mechanism, upon actuation of the carriage return key, clutches a spool 147 to the said extension of the shaft of roller 110. The spool has wound upon it a flexible band 148, which is attached in a well known manner to the carriage of the typewriter. Thus, when the clutch 149 is engaged, the band 148 is wound up and the carriage is returned to its right end position. As it approaches the limit of its return movement an arm 174 fixed on the carriage engages the bottom edge of lever 166, which has been held down by the toggle action, and lifts the lever, releasing the clutch 149 and stopping the carriage return movement.

Figure 12:
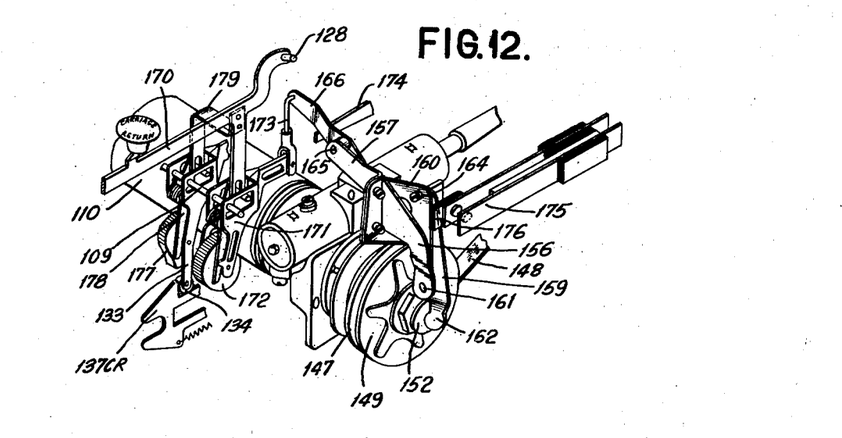
Fig. 12 is a perspective view of the carriage return control mechanism of the Radiotype printer and associated feed hole punch control contacts.

In addition to initiating the operation of the carriage return mechanism of the punch controlling printer, the key bar 170 also causes the code designation for "carriage return" to be punched in the tape. For this purpose a special two-lobed cam 177 is mounted on a bell crank lever 178 and provided with the usual latch mechanism, as previously described, which is operated by an auxiliary forked arm 179 rigidly secured to the carriage return keybar 170. The bell crank lever 178 carries a depending arm 133 bearing a roller 134, which engages a selector slide 137CR. This selector slide cooperates with a particular group of permutation bars 140, in the same way as the character selector slides previously described, to cause the code designation for "carriage return" to be punched in the tape. The special cam 177 is used to operate the carriage return selector slide, rather than to operate it directly from the single lobed cam 172, because the action of the latter is slower and would be apt to cause duplicate perforation of the "carriage return" code designation.

Figure 8:
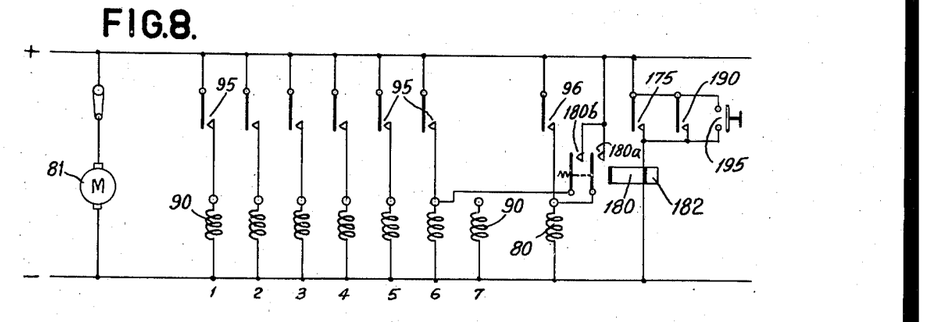
Fig. 8 is a simplified wiring diagram.

In accordance with the invention, provision is made to continue the punching of feed holes, or a fixed code selection, in the tape during the carriage return movement. For this purpose, there is mounted adjacent the arm 159 a pair of contacts 175. A piece of insulation 176 fixed to one member of the pair of contacts 175 is positioned so as to be engaged by the operating arm 159, to close the contacts 175 when the clutch is thrown in. The contacts remain closed until the clutch is released at the end of the carriage return movement. These contacts, as shown in Fig. 8, control the circuit of a relay 180. The contacts 180a of the relay are connected in parallel to the start contacts 96, while the contacts 180b are connected to the number 6 selector magnet 90. Thus the clutch magnet 80 will remain energized throughout the carriage return movement and during this time the feed hole punch and the "6" hole punch will be operated repeatedly, to punch a series of timing perforations, the number of which will depend upon the time required for the carriage return movement. This is the arrangement used where the signals directly control a punch unit, the "6" hole causing the punch unit to space, but being without influence on the printer subsequently controlled by the tape. The use of the "6" hole for spacing the receiving punch unit is, of course, merely illustrative. If the signals are received by a printer the b contacts of the relay 180 and their connection to the No. "6" magnet, will be omitted and the sending punch unit will merely punch a series of feed holes during carriage return.

As a safety measure, the relay 180 is provided with a shortcircuited auxiliary winding 182, which delays the opening of the contacts 180a and 180b after the contacts 175 have opened, long enough to cause the feed hole punch and the "6" hole punch to make at least one extra perforation. This is enough to take care of any slight difference in the time required for the return movement of the carriage of the receiving typewriter, when the message is being transmitted from the tape, or printed under control of a reproduction of the sending tape. In starting the carriage return, the closure of the relay contacts 180a and 180b, while delayed slightly by the shortcircuited winding 182, occurs in time to hold the punch clutch magnet 80 energized, and to energize the No. "6" magnet, at the time the clutch is approaching the end of its first revolution.

Figures 13, 14, 15:
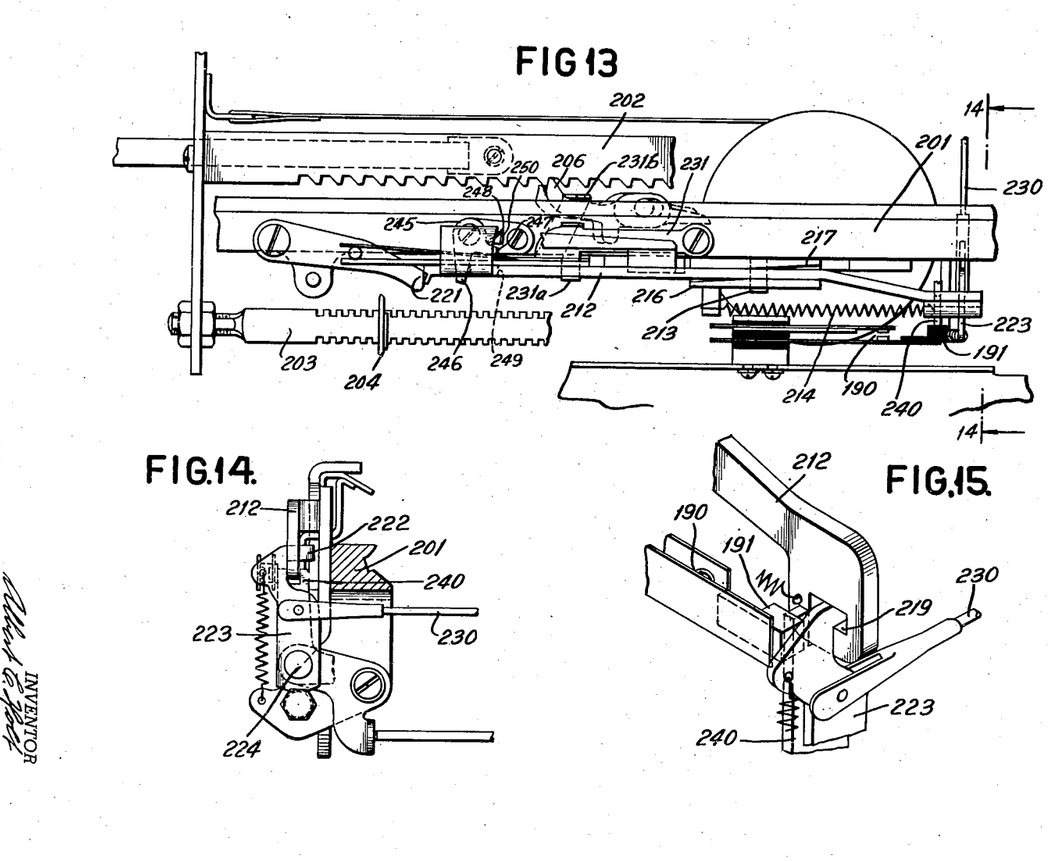
Fig. 13 is a plan view of a portion of the carriage of the Radiotype printer, showing parts of the tabulating mechanism and associated feed hole punch control contacts.
Fig. 14 is a sectional view on the line 14—14 of Fig. 13, showing a portion of the tabulating control mechanism in side elevation.
Fig. 15 is a perspective view of the mechanism shown in Fig. 14.

Provision is also made to operate the feed hole punch and the No. "6" magnet during tabulating movements of the carriage, to make a controlled number of timing perforations. The tabulating mechanism shown in the drawings is similar to the one disclosed in the patents to C. W. Crumrine, Nos. 1,935,436 and 2,129,650, to which reference is made for a full description of the construction of the mechanism. A tabulating dog 212 is mounted upon a pin 213 on the frame bar 201, so as to have rocking movement about a vertical axis, as well as about the horizontal axis of the pin 213. The movement about the vertical axis is provided for by horizontally elongating the hole in the dog 212 through which the pin 213 extends, and is limited by abutments 216 and 217. The elongation of the pivot hole in the dog 212 also allows the dog a short horizontal movement, under the control of a spring 214, which normally holds the dog at the left limit of said movement and also biases the dog in clockwise direction (Fig. 13). When the dog rocks about the vertical axis (counterclockwise in Fig. 13), upon initiation of a tabulating operation, its left end 221 moves into position to strike a tabulating stop 204, when the tabulating movement is completed. The stop 204 is adjustably mounted upon a stationary slotted bar 203. The dog is temporarily locked in position to strike the stop 204, by a detent 245 having two arms 246 and 247. The detent is biased in counterclockwise direction in Fig. 13 by a spring 248 and, in the normal position of dog 212, is held in the position shown in Fig. 13, against the force of spring 248, by a lug 249 extending down from the bottom edge of the dog 212. The movement of the dog 212 to tabulating position allows the detent to drop behind the lug 249 in which position it is stopped by abutment of its arm 247 against a stop 250. Since the dog 212 is biased to the left limit of its movement on the pin 213 by spring 214, it is capable of moving a short distance to the right when the dog strikes the stop 204. This movement to the right of the dog 212 is sufficient to bring the left edge on the lug 249 to the right of the detent arm 249, allowing the dog 212 to swing back to normal position. The normal step-wise movement of the carriage is controlled by escapement pawls 206 coacting with a rack bar 202, in well known manner. In tabulating operations the escapement pawls are withdrawn from the rack bar for the duration of the tabulating movement, by the dog 212, through the intermediary of a pivoted arm 231, which has an ear 231a engaging the dog 212 and another ear 231b engaging the pawls 206.

The rocking of the dog 212 to initiate a tabulating operation is derived through a link 230, from a power driven cam controlled by a tabulating key. This key and cam mechanism can be identical with that shown in Fig. 9; consequently, no view showing the tabulating key and cam specially has been included in the drawings. It is preferred, however, to use a single lobed cam, like the carriage return cam 172 (Fig. 12). The cam mechanism operates a slide 137 to cause a "tabulate" code signal to be punched in the tape. The link 230 is articulated to a lever 223 pivotally supported at 224 and having at its upper end a hook 222 engaging in a hole 219 of the dog 212. A forked lever 240, also pivoted at 224, engages the dog 212 so as to be rocked toward the bar 201 when the tabulating mechanism is operated. In accordance with the invention a pair of contacts 190 is mounted so that an insulating member 191 on the end of one of the contacts rests against the lever 240 and normally holds the contacts 190 open. When the lever 240 is rocked in by the tabulating mechanism, the contacts 190 close and remain closed until the end of the tabulating movement. As seen in Fig. 8, the contacts 190 are connected in parallel to the contacts 175, and thus control the relay 180 in the same way.

A manually operable switch 195 is connected in parallel to the contacts 175 and 190, to permit voluntary control of the timing punch means for a length of time determined by the operator.

It will be observed that provision has been made to cause the timing punch means to operate during functional operations of the machine which controls the punch, for variable lengths of time, determined by the time required to perform said functional operations; thus punching a number of timing perforations dependent upon the time required for the particular functional operation. Fig. 17 shows a section of tape illustrating the operation of the machine. At the left end of the tape is a series of eight feed holes and eight "6" holes, in a section of the tape identified as "Run in." These are made by holding down the key 195 for a brief time, while pulling on the end of the tape, to get the tape started. Then follow four code combinations of perforations representing the word "test," and next the carriage return code signal. This is succeeded by four pairs of timing perforations, namely feed holes and "6" holes, the number of pairs being determined by the time required for the carriage to return to its right end position. Code signals representing the word "tape" then appear, followed by a TAB. code signal and three pairs of timing perforations feed holes and "6" holes, the number of pairs of these timing perforations being determined by the time required for this particular tabulating movement. Code signals for the number 534 are then punched, followed by another TAB. signal and two additional pairs of timing perforations feed holes and "6" holes, conforming to a shorter tabulating movement. Finally, the tape shows code signals for the number 621. This is the character of tape made by a system wherein a reproducing punch at the receiving station is controlled directly by the transmitted signals. If the signals control a printer at the receiving station, the tape will appear as in Fig. 17a. In this case the timing perforations following the TAB. signal are single feed holes.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A tape perforating apparatus comprising a punching unit and a control unit, said punching unit comprising timing punch means and code punch means, said control unit comprising means selectively to control said code punch means, a carriage, and means for imparting to said carriage continuous movements of different extents requiring different periods of time for their completion; and means controlled by said last means to maintain said timing punch means in repeated operation during any such movement of the carriage, for a period of time not less than the time required to complete said movement of the carriage and for an additional period long enough to make one or more additional timing perforations after the movement of the carriage is terminated.

2. In an apparatus for perforating a tape in code and simultaneously making a corresponding printed record, perforating mechanism including timing punch means for punching holes in the tape having no controlling significance for a receiving printer, code punch means, and actuating means for said punch means; typewriting mechanism comprising a carriage, character keys, carriage return mechanism, and a carriage return key controlling the latter; means controlled by said character keys to control the operation of certain of said code punch means; means controlled by said carriage return key to cause said code punch means to punch a "carriage return" code signal; and means controlled by said carriage return mechanism to cause repeated operation of said timing punch means for the duration of the carriage return movement.

3. Tape perforating apparatus comprising a feed hole punching element and code punching elements, constantly running driving means, normally stationary actuating means for said punching elements, start-stop mechanism adapted to connect said actuating means to said driving means, said feed hole punching element being normally conditioned for operation by said actuating means and said code punching elements being normally conditioned for non-operation by said actuating means, means for releasing said start-stop mechanism and selectively conditioning said code punching elements for operation by said actuating means in unison with said feed hole punching element, to punch character code signals; means for releasing said start-stop mechanism and selectively conditioning said code punching elements for operation by said actuating means in unison with said feed hole punching element, to punch a special code signal; and means set in operation by said last releasing means for maintaining said start-stop mechanism released during a certain number of operations of said feed hole punching element, to form an automatically determined series of feed holes following said special code signal.

ALBERT C. HOLT.